F. A. PETTIBONE.
TIRE TIGHTENER.
APPLICATION FILED FEB. 24, 1915.
1,153,822.
Patented Sept. 14, 1915.
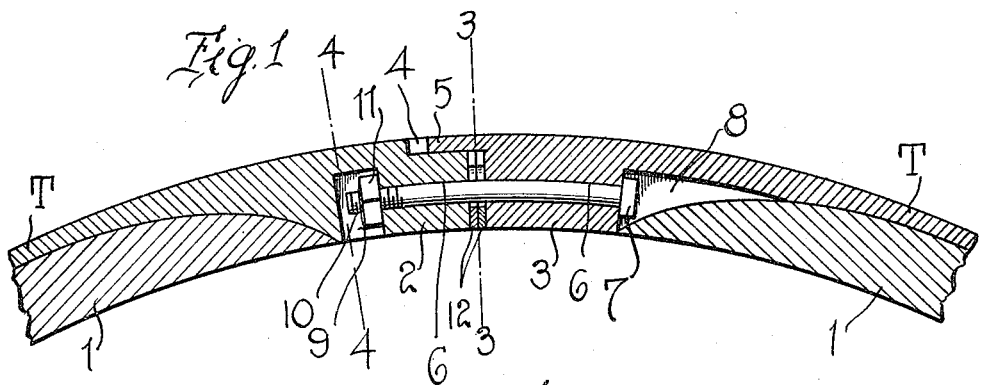
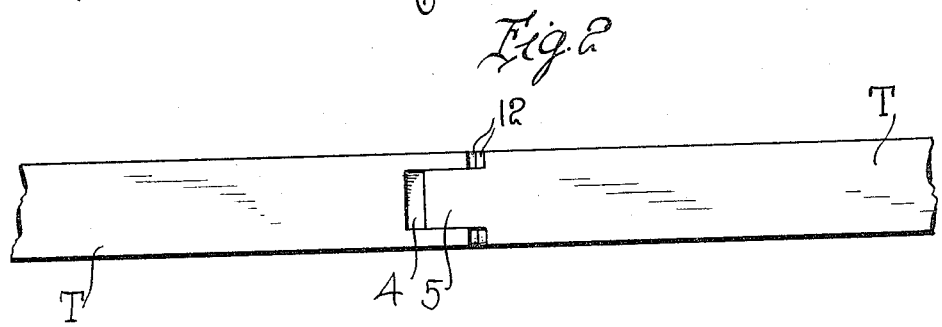
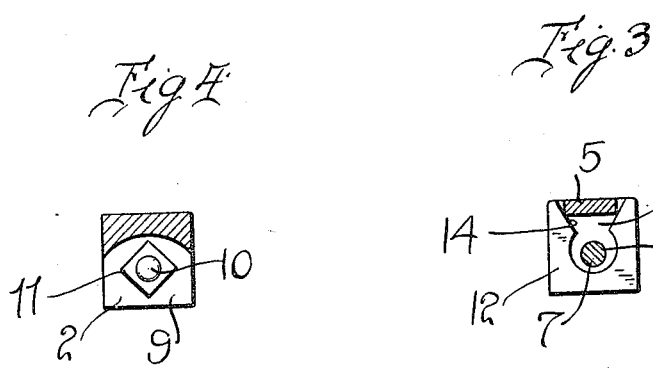
Inventor
F. A. Pettibone
Witnesses
Robert M. Sutphen
A. L. Hind
By Watson E. Coleman
Attorney

UNITED STATES PATENT OFFICE.

FRANKLIN A. PETTIBONE, OF CONEWANGO VALLEY, NEW YORK.

TIRE-TIGHTENER.

1,153,822.          Specification of Letters Patent.          Patented Sept. 14, 1915.

Application filed February 24, 1915. Serial No. 10,264.

*To all whom it may concern:*

Be it known that I, FRANKLIN A. PETTIBONE, a citizen of the United States, residing at Conewango Valley, in the county of Cattaraugus and State of New York, have invented certain new and useful Improvements in Tire-Tighteners, of which the following is a specification, reference being had to the accompanying drawings.

This invention relates to certain improvements in tire tighteners; and an object of the invention is to provide a device of this general character having novel and improved means whereby a tire may be contracted or expanded with convenience and facility in accordance with the necessities of practice.

The invention consists in the details of construction and in the combination and arrangement of the several parts of my improved tire tightener whereby certain important advantages are attained and the device is rendered simpler, less expensive and otherwise more convenient and advantageous for use, all as will be hereinafter more fully set forth.

The novel features of the invention will be carefully defined in the appended claim.

In order that my invention may be the better understood, I will now proceed to describe the same with reference to the accompanying drawings, wherein—

Figure 1 is a longitudinal sectional view illustrating a tire tightener constructed in accordance with an embodiment of my invention; Fig. 2 is a top plan view of the device as disclosed in Fig. 1; Fig. 3 is a sectional view taken substantially on the line 3—3 of Fig. 1; and Fig. 4 is a sectional view taken substantially on the line 4—4 of Fig. 1.

As disclosed in the accompanying drawings, 1 denotes the felly of a wheel having a portion thereof separated and between the extremities of the felly are adapted to be positioned the members 2 and 3 comprised in my improved tightener and which when in applied position are adapted to be disposed in continuity relative to the tire T. As herein embodied, the adjacent extremities of the members 2 and 3 are adapted to abut and the peripheral portion of the member 2 at its normally free end is provided with the recess 4 adapted to receive the tongue or extension 5 carried by the peripheral portion of the member 3 at the transverse center thereof. The adjacent extremities of the members 2 and 3 are provided with the longitudinally disposed openings 6 adapted to register and through which is directed the headed member 7, the blank 10 whereof being threaded and being disposed across the transversely arranged recess produced in the member 2 at a predetermined point remote from the free or outer extremity of the member and intersecting the opening 6. The inner extremity 8 of the opening 6 disposed through the member 3 is angular in cross section at its rear portion while the shank is of corresponding cross section whereby it will be perceived that the headed member is maintained against axial rotation.

Positioned within the recess 9 is a nut or bur 11 in threaded engagement with the shank 10 whereby it will be perceived that the felly may be permitted to expand or contract upon suitable axial rotation being imparted to the nut or bur 11.

When the occasion requires that the adjacent extremities of the members 2 and 3 be separated, I find it of advantage to interpose between said separated extremities the washers or filler members 12, herein disclosed as of a configuration substantially identical to the configuration of the adjacent ends of the members 2 and 3 and provided with a central opening through which the shank 10 projects and having in communication therewith a radial slot 14, the opposed free extremities whereof being inwardly beveled and adapted to engage the opposite marginal portions of the tongue or extension 4. It will be readily understood that upon the insertion or removal of a washer that the nut or bur 11 is suitably rotated to result in firmly securing the adjacent extremities of the members 2 and 3.

From the foregoing description, it is thought to be obvious that a tire tightener constructed in accordance with my invention is of an extremely simple and comparatively inexpensive nature and is particularly well adapted for use by reason of the convenience and facility with which it may be assembled, and it will also be obvious that my invention is susceptible of some change and modification without material departure from the principles and spirit thereof and for this reason I do not wish to be understood as limiting myself to the precise arrangement and formation of the several parts herein shown in carrying out my invention in practice.

I claim:

In combination, a split tire, the peripheral portion of one extremity of the tire being provided with a recess, an extension projecting from the peripheral portion of the adjacent extremity of the tire adapted to be received within the recess, said extension being of a width less than the width of the tire and positioned at substantially the transverse center of the tire, clamping means coacting with the extremities of the tire, and a filler washer adapted to be inserted between the adjacent extremities of the tire, said washer being provided with a radial slot to straddle the clamping means and to engage the opposite marginal portions of the extension, the opposed edges of the slot being inwardly beveled, said radial slot being in communication with the bore of the washer, the beveled edges of the slot radiating from the axial center of the bore of the washer, said beveled edges being arranged for contact with the longitudinal edges of the extension.

In testimony whereof I hereunto affix my signature in the presence of two witnesses.

FRANKLIN A. PETTIBONE.

Witnesses:
I. F. HICKOK,
LAURA HOLLISTER.

Copies of this patent may be obtained for five cents each, by addressing the "Commissioner of Patents, Washington, D. C."